Jan. 16, 1934.  W. D. FOSTER  1,944,025

FILM HANDLING APPARATUS

Filed April 9, 1929

INVENTOR.
W. D. FOSTER.
BY Waldo G. Morse
ATTORNEYS.

Patented Jan. 16, 1934

1,944,025

UNITED STATES PATENT OFFICE

1,944,025

FILM HANDLING APPARATUS

Warren Dunham Foster, Washington Township, Bergen County, N. J., assignor to Kinatome Patents Corporation, New York, N. Y., a corporation of New York Application April 9, 1929. Serial No. 353,753

29 Claims. (Cl. 88—17)

The present invention relates broadly to the art of photography and more particularly to improvements in apparatus adapted for the handling of films, whether for the projection or taking of successive pictures, or for the reproduction or recordation of images representing sound. It will readily be understood, however, that the present invention is applicable to many other uses.

The present invention discloses means useful in the initial positioning of a film in a film handling apparatus, when it is desired to project both still and motion pictures from the same mechanism, and in connection with the handling of a film which bears images representing sound or designed to control the operation of a related apparatus or the same apparatus.

In an apparatus for the handling of a film in each edge of which there is more than one perforation per frame line, as in the standard thirty-five millimeter theatrical film, it is necessary initially to position or "frame" the image in reference to the aperture. To facilitate such positioning, auxiliary illumination has been provided to direct light upon the gate so that the operator can see the images upon the film and hence properly adjust the film relative to the aperture. Because of their small size, the images upon the film are difficult to see, and the placing and the operation of the auxiliary light present problems. It is also common practice to "frame" the image upon the regular projecting screen while the film is stationary, prior to the regular projection in motion, first having introduced a shield to cut down the light reaching the film so that it is not damaged by heat. Such practice obviously is objectionable when an audience is present. Another common practice is for the operator to interpose an improvised screen between the stationary film and the port of the booth. Such image, however, is out of focus if apparatus is adjusted so that a correct image is projected upon the regular screen, and if the operator re-focuses for the improvised screen, he must again re-focus upon the regular screen, thus annoying an audience.

An object of the present invention is to provide means whereby the operator may accurately initially position or "frame" the film in the apparatus, without any of the objections to which reference has been made above, and in a manner which is simple, easy, and effective.

Another object of the present invention is to provide means whereby a still picture may be projected in one direction and a motion picture projected in another direction, the change between such directions being automatically accomplished. Another object is to provide means whereby image bearing material may be projected in proper focus upon either of two screens, the change in such projection being either automatically or manually produced. A further object is the provision of interlocking control mechanism for a prism or other image-deflecting means and a heat shield. A further object is the provision of means whereby a photo-electric cell is in cooperative relation with an aperture while a film is being moved thereby and out of such relation when the film is stationary thereat. Other objects, advantages, and characteristics are evident from the following specification, the attached drawing, and the subjoined claims. It will be readily understood, however, that I am not limited to the particular disclosure herein made, since other constructions are possible without departing from the spirit of the invention or the scope of the broader claims. In the accompanying description, my invention is applied to a motion picture projector, but it will be understood that in many respects it is applicable to other types of film handling apparatus.

Figure 1:
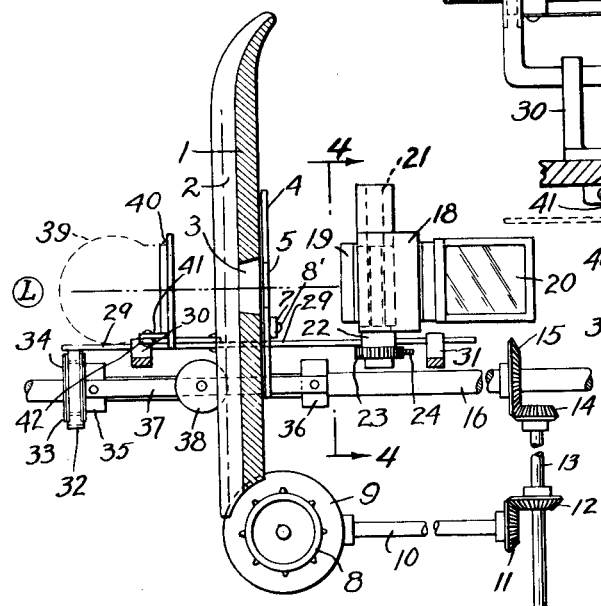
Figure 1 is a right side elevation with parts in section of apparatus constructed according to the present invention.

In carrying out the present invention, I may make use of any desired type of film handling apparatus, the film handling apparatus itself constituting no part of the present invention. Such apparatus may comprise a fixed gate section 1, which is attached to the main frame F, embodying a film channel 2 which crosses the aperture 3 which cooperates with the framing plate 4 bearing the framing aperture 5, such plate being attached by the pin 6 to the framing handle 7, which is pivoted upon the pin 8' attached to the fixed gate section 1. It will be understood that any preferred type of framing device may be used. Below the gate may be positioned a feeding sprocket 8 operated by any preferred type of intermittent movement housed in the casing 9 and driven by the shaft 10 which through the gears 11 and 12 is driven by the shaft 13 which through the gears 14 and 15 is driven by the shaft 16 upon one end of which may be positioned an optical shutter, not shown.

Upon the frame 18, I may mount the objective lens 19 and prism 20. Attached to the side of the apparatus, not shown, or otherwise conveniently placed, in line with the optical axis of the prism 20, is the ground glass 21. By reason of this construction, it will be evident that an image projected by means of the light source L through the aperture 3 will be thrown upon the ground glass 21. The objective lens 19 may be of fixed focus whereby the image upon the screen 21 is always in focus or, if desired, it may be adjustable whereby an image may be projected upon the side of the projection booth, or upon another screen, the ground glass 21 being removable. In place of a prism, a mirror or other image-deflecting element may be used, and in place of a ground glass any desired type of rear projection screen may be used.

Figure 2:
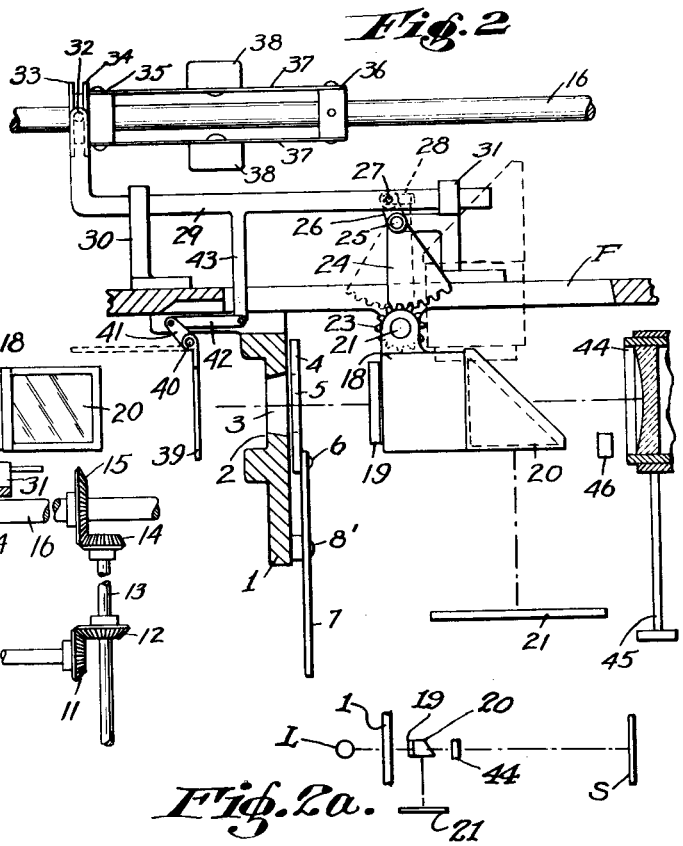
Figure 2 is a plan view with parts in section of the same.
Figure 2A:
Figure 2a is a diagrammatic plan view of my apparatus.

The frame 18 supporting the optical unit just described may be attached to the shaft 21 which is suitably mounted in a bearing 22 projecting from the main frame F. To such shaft may be attached the pinion 23 which meshes with the arcuate toothed rack 24 pivoted as upon the pin 25 and moved by the arm 26, a pin 27 attached thereto cooperating with the slot 28 of the control rod 29, such rod being supported by the bracket 30 and by the bracket 31, such bracket 31 also serving to support the shaft 25. To the left hand end of the operating shaft 29, as viewed in Figure 2, is attached a yoke from which extend the pins 32 which operate in the groove 33 of the collar 34. Such collar is attached to the governing element which comprises the heads 35 and 36 joined by the light flat springs 37 bearing thereon the weights 38. By reason of such construction, it will be evident that the revolution of the shaft 16, which drives the feeding sprocket 8, will be effective relatively to displace the weights 38, thus moving the control rod 29 to the right, as viewed in the drawing, the arm 26 in a clockwise direction, rotating the rack 24 in a clockwise direction, the pinion 23 in an anti-clockwise direction, and moving the optical element comprising the lens 19 and the prism 20 from the position shown in full line in Figure 2 to the position shown in dotted line.

In order to reduce the light upon the film while motionless at the gate, a heat screen 39, composed of wire mesh, or of so-called heat-reducing glass, or of other suitable substance, may be mounted upon the rod 40 from which extends the arm 41 which, through the link 42, is operated by the right angled extension 43 from the control rod 29. By reason of such construction, it will be evident that such heat reducing element 39 will be removed from heat reducing position simultaneously with the removal of the optical unit which includes the prism from cooperative relation with the aperture, such movement taking place in timed relation to the actuation of the feeding sprocket.

An objective lens 44, adjustable by means of the handle 45, may be suitably positioned for cooperation with the aperture, the light from such aperture being thereby focused upon the regular projection screens before the audience.

A photo-electric cell 46, indicated diagrammatically in Figure 2, may be positioned in front of the image-deflecting element 20, so that, in the manner previously described, such cell will be shielded from the light from the aperture when the film is motionless. Such cell may be positioned, if desired, in front of the objective lens 44, or it may cooperate with a special aperture, not shown, the objects supported by the frame 18 being effective to shield it from light from such aperture while such frame is in the position shown in full line in Figure 2. Such photo-electric cell may be used for any desired purpose, such as, for example, those shown in the co-pending application of Earle L. Parmelee and myself, Serial Number 105,159, filed April 28, 1926, or in connection with apparatus for the reproduction or recordation of sound. Said co-pending application fully describes and claims apparatus in which all of the operable elements of the film handling apparatus-feeding means, compensating means, rewinding means, gate operating means, for example—are controlled by a photo-electric cell which is operated by special markings placed upon the film.

Figure 3:
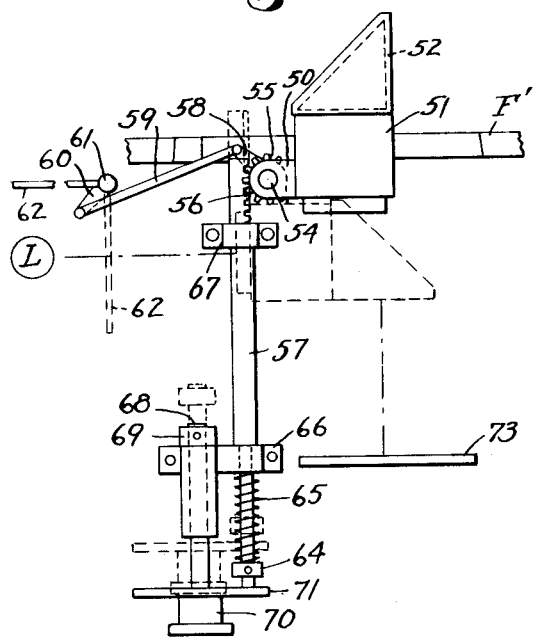
Figure 3 is a plan view of a preferred modification.
Figure 4:
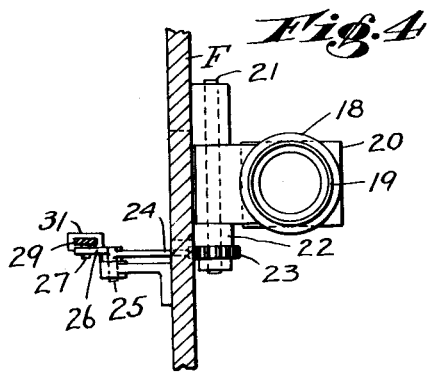
Figure 4 is a view taken on the line 4—4 of Figure 1.

Figure 3 shows a preferred modification of the device.

In such modification, the frame 50, supporting the optical unit consisting of the lens 51 and the prism 52, is mounted upon the shaft 54 supported by the main frame F' to which shaft is attached a pinion 55 which meshes with the teeth 56 on the rack bar 57. From the shaft 54 extends the arm 58 to which is pivotally attached the link 59 which is also rotatably attached to the arm 60 pinned to the shaft 61 upon which is mounted the heat screen 62, such heat screen being composed of any substance suitable for reducing the heat of the light source L while permitting sufficient light to pass through to illuminate the film and to project a still image. The rack bar 57 terminates outwardly in a head 64 forced outwardly by the spring 65. The bearings 66 and 67 serve to support and guide the bar 57, and the bearing 66 may be enlarged to include a bearing surface for the control rod 68, to the inner end of which is pinned the collar 69 and to the outer end of which are pinned the button 70 and the collar 71, such collar working against the end of the rack bar 57.

By reason of such construction, it will be evident that when the operator presses the button 70 inwardly toward the body of the apparatus he will rotate the optical elements 51 and 52, from the position shown in full line in Figure 3 to that shown in dotted line, into the path of the light source L and likewise position in such path the heat screen 62, thus protecting the film from heat while projecting an image upon the ground glass 73 or other suitable screen, either transparent or opaque.

If desired, a detent may be provided whereby the image-deflecting unit remains in cooperative relation with the aperture after having been so placed until it is again operated by a manual movement. Under many conditions, however, it will be found desirable to use the above construction without a detent so that when the operator removes his finger from the button 70 the apparatus is ready for regular projection in motion.

If desired, the heat screen as herein described in some cases may be omitted, reliance being placed upon the heat screen which is ordinarily supplied as a part of apparatus of certain types.

Many of the advantages of the present invention have been set out in the preceding portion of this specification. Other advantages include the provision of means whereby an operator can quickly, easily, and effectively "frame" the film at the aperture without damage to the film. Other advantages include the provision of means whereby such a device is automatically removed from operative position by the starting of the regular film feeding operation. Other advantages include the provision of means whereby the operator may manually position an image deflecting device in the path of image bearing light, such positioning being accompanied by the interposition of a heat shield which protects the film. Further advantages include the provision of means whereby a magnified image of the aperture is automatically projected upon a special screen adjacent to the apparatus after and prior to the projection upon the regular screen before the audience.

Still further advantages include the provision of means whereby a still picture is automatically projected in one direction and upon one screen, and a motion picture is projected in another direction and upon another screen, both such pictures being properly focused without especial attention because of such change of direction or screen.

I claim:

1. In a film handling apparatus, an aperture, means for feeding a film past said aperture, a source for passing light through the film at said aperture, operable means adapted for deflecting the image formed from the film at said aperture, means for positioning said image-deflecting means in cooperative relation with said aperture, and a single member for driving said feeding means and operating said positioning means.

2. In a film handling apparatus, an aperture, means for feeding a film past said aperture, a source for passing light through the film at said aperture, operable means for deflecting the image formed from the film by such light at said aperture, and mechanism operatively connecting said image-deflecting means and said feeding means, said mechanism having devices for maintaining said image deflecting means in cooperative relation to said aperture while said feeding means is inoperative.

3. In a film handling apparatus, an aperture, means for feeding a film past said aperture, a source for passing light through the film at said aperture, operable means adapted for cooperation with said aperture, for deflecting the image formed from the film by such light at said aperture, and mechanism operatively connecting said image-deflecting means and said feeding means and adapted to maintain said image deflecting means out of cooperative relation with said aperture while said feeding means is operative.

4. In a film handling apparatus, an aperture, means for feeding a film past said aperture, means for passing light through said aperture, means for deflecting the image formed from the film at said aperture, means for positioning said image deflecting means in cooperative relation with said aperture, and operating mechanism interlocking said positioning means and said feeding means for necessarily operating said positioning means upon the stopping of operation of said feeding means.

5. In a film handling apparatus, an aperture, means for feeding a film past said aperture, a source for passing light through the film at said aperture, a first means normally operative to pass the image formed from the film at said aperture in a given direction, a second and alternatively operable means adapted for cooperation with said aperture and effective for deflecting the image formed from the film by such light at said aperture and to pass it in another direction, means for removing said second or image deflecting means from cooperation with said aperture so that said first means may be effective, an operating connection between said removing means and said feeding means, including devices for operating said removing means in predetermined relation to the initiation of operation of said feeding means, and means for maintaining said second or image deflecting means out of cooperative relation to said aperture during the operation of said feeding means.

6. In a film handling apparatus, an aperture, means for feeding a film past said aperture, means for passing light through the film at said aperture, a first means for projecting images formed by such light from the film at said aperture in one direction, a second means for projecting such images in another direction, an actuating member movable to a first position wherein it moves said second means into cooperative relation with said aperture and renders the other of said means inoperative and movable to a second position wherein it moves said second of said means from such cooperative relation with said aperture and renders the first of said means operative and an operating connection between said feeding means and said member which moves said member from one of said positions to the other when the speed of operation of said feeding means attains a predetermined rate.

7. In a film handling apparatus, an aperture, a member for feeding a film past said aperture, a source for passing light through the film at said aperture, means for driving said feeding member for moving the film at a speed greater than the persistence of human vision whereby motion pictures are projected from the film fed thereby through light from said source, means for projecting an image produced by such light from the film at said aperture in one direction, auxiliary means for projecting such an image in another direction, means for moving said auxiliary means into operative relation with said aperture, and control mechanism interlocking said moving means and said driving means for operating said moving means when said driving means becomes inoperative.

8. In a film handling apparatus, an aperture, means for feeding a film past said aperture, means for passing light through the film at said aperture, a first screen, means for focusing the images so produced upon said first screen, a second screen, said second screen being disposed at a distance from said aperture different from that at which said first screen is disposed, means for focusing such images upon said second screen, means for successively causing each of said focusing means to be in cooperative relation with such images at said aperture, and operating mechanism interlocking said last mentioned focussing means and said feeding means effective to operate said last mentioned means in accordance with the speed of operation of said feeding means.

9. In a cinematographic apparatus, an apertured gate, a member for feeding a film through said gate past the aperture thereof, means for passing light through the film at said aperture, means for driving said member for moving the film at a speed greater than the persistence of human vision whereby motion pictures are projected from the film at said gate, a first screen, means for projecting such motion pictures from said aperture upon said screen, a second screen, said second screen being disposed from said gate a distance different from that at which said first screen is so disposed, auxiliary means for directing an image from the film at said gate upon said second screen, said auxiliary means including means for focussing such last mentioned image when directed upon said second screen, and an operating connection between said auxiliary means and said driving means for placing said auxiliary means in operative relation with said gate and said second screen in timed relation to the stopping of operation of said feeding means and for removing said auxiliary means from said operative relation with said gate in timed relation to the initiation of the operation of said feeding means.

10. In a film handling apparatus, an apertured gate, a member for feeding a film through said gate past the aperture thereof, a source for passing light through the film at such aperture, means for driving said member at such speed that motion pictures are projected by light from said source from the film at such aperture, means movable into and from cooperative relation to such aperture for deflecting an image at such aperture produced by light from said source, and speed-responsive control mechanism operatively connecting said driving means and said image deflecting means for keeping said deflecting means out of cooperative relation with said aperture while said driving means is being operated above a predetermined rate.

11. In a cinematographic apparatus, an aperture, means for feeding a film past said aperture, a first image-receiving structure, means for passing the image of the film at said aperture to said first image-receiving structure, a second image-receiving structure placed in an angular relation to said first image-receiving structure, means for deflecting the image of the film at said aperture from said first image-receiving structure and passing it to said second image-receiving structure, said image-deflecting means being bodily movable into and out of cooperative relation to said aperture, and speed-responsive control means operatively interconnected with said feeding means for bodily moving said image-deflecting means into and out of cooperative relation to said aperture in accordance with the speed of operation of said feeding means.

12. In a motion picture apparatus, an aperture, a member for feeding a film past said aperture, a source for passing light to the film at said aperture, means for driving said feeding member, means for deflecting the image of the film created by light from said source at said aperture, said light deflecting means being bodily movable from and to a predetermined position upon the side of said aperture other than that upon which said light source is disposed wherein it is cooperatingly disposed relative to said aperture whereby it deflects the image created by said light at said aperture, and mechanism operatively interconnecting said moving means and said driving means for operating said moving means for maintaining said image deflecting means in such cooperative relation with said aperture while said driving means is inoperative.

13. In a film handling apparatus, a gate, a member for feeding a film through said gate, means for driving said feeding member for moving the film at a speed greater than the persistence of human vision whereby motion pictures are projected from the film so fed, a first screen, means for projecting said motion pictures upon said first screen, a second screen, auxiliary means for projecting an image of the film at said gate upon said second screen, said auxiliary means being movable into and out of operative position relatively to said gate and to said second screen, and operating mechanism for said auxiliary means operatively connected to said driving means for placing said auxiliary means in operative position relatively to the aperture of said gate and said second screen in predetermined relation to the stopping of operation of said driving means.

14. In a film handling apparatus, an apertured gate, a member for feeding a film through said gate and past the aperture thereof, means for driving said feeding member for moving the film at a speed greater than the persistence of human vision whereby motion pictures are projected from the film so fed, a first screen, means for projecting such motion pictures upon said first screen, a second screen, auxiliary means movable from and to operative relation to said gate and said second screen for projecting an image of the film at said gate upon said second screen, and operating mechanism for said auxiliary means operatively connected to said driving means for removing said auxiliary means from such operative relation to said gate and to said second screen in predetermined relation to the initiation of operation of said driving means.

15. In a film handling apparatus, an aperture, before which a film may be fed, means for passing light through the film at said aperture, means for projecting images so produced at said aperture in one direction, means for projecting such images in another direction which is angular to such first mentioned direction, a rotatable mounting for said second mentioned projecting means, and means for moving said second mentioned projecting means into a position between said aperture and said first mentioned projecting means wherein it is disposed in cooperative relation to such aperture, said moving means comprising a pinion attached to said rotatable mounting, a rack for operating said pinion, and means for moving said rack whereby said mounting is rotated.

16. In a film handling apparatus, an aperture before which a film may be fed, means for passing light through the film at said aperture, means for projecting images so produced at said aperture in one direction, means for projecting such images in another direction which is angular to such first mentioned direction, and means for moving said second mentioned projecting means into a position between said aperture and said first mentioned projecting means wherein it is disposed in cooperative relation to such aperture and prevents the passage of light to said first projecting means, said moving means comprising a pinion attached to said rotatable mounting, and means for rotating said pinion, said means comprising a rack bar, a spring for moving said rack bar in one direction, and a handle for moving said rack bar in the other direction against the power of said spring.

17. In a film handling apparatus, an aperture, means for feeding a film past said aperture, a prism normally positioned out of cooperative relation with said aperture whereby an image upon the film at said aperture is not affected by said prism, means for bodily moving said prism into cooperative relation with said aperture, whereby an image of the film at said aperture is deflected by said prism, and a speed-responsive operating connection between said feeding means and said moving means for operating said moving means when the speed of operation of said feeding means falls below a pre-determined point whereby said prism is removed from image-deflecting relation with said aperture.

18. In a motion picture apparatus, an aperture, means for feeding a film past said aperture, means for passing light to the film at said aperture, a prism bodily movable to cooperative image-deflecting relation to said aperture from a position relatively distant to said aperture wherein it does not affect the image of the film at said aperture, means for bodily moving said prism to such cooperative from such relatively distant position, and an operating speed-responsive connection between said feeding means and said moving means for operating said moving means when the speed of operation of said feeding means exceeds a predetermined rate.

19. In a film handling apparatus, an aperture, a member for feeding a film past said aperture, a source for passing light to the film at said aperture, means for driving said feeding member, an objective lens, said objective lens being disposed upon the side of said aperture opposite that upon which said light source is disposed whereby said lens modifies the image created by said light at said aperture, means for bodily moving said objective lens angularly with respect to its axis into cooperative relation with said aperture, and a speed responsive operating connection between said driving means and said moving means effective for operating said moving means when the speed of operation of said driving means falls below a pre-determined rate.

20. In a film handling apparatus, an aperture, a member for feeding a film past said aperture, a source for passing light to the film at said aperture, means for driving said feeding member, an objective lens adapted to be moved into and out of cooperative relation with said aperture, said objective lens being so movable into a position upon the side of said aperture opposite that upon which said light source is disposed whereby the image created thereby at said aperture is modified, means for moving said lens out of such relation with said aperture, and an operating connection between said driving means and said moving means including speed controlled devices for operating said moving means when the speed of operation of said driving means exceeds a pre-determined rate.

21. In a film handling apparatus, an aperture, an objective lens, a source for directing light through said aperture and said lens, an auxiliary lens, a mounting for said auxiliary lens so arranged as to move said auxiliary lens to or from a position between said first mentioned objective lens and said aperture, image deflecting means cooperating with said auxiliary lens and disposed upon said mounting for directing an image at said aperture in a direction angular to the optical axis of said aperture and said first mentioned lens, and means for moving said mounting to or from such position between said aperture and said first mentioned lens, said means comprising a driving shaft, an element mounted thereupon to be movable relatively thereto in accordance with the speed of rotation of said shaft, and a connection between said element and said mounting whereby such movement of said element operates said mounting.

22. In a cinematographic projector, an aperture, means for feeding a film past said aperture, a source for passing light through the film at said aperture, a screen, an objective lens cooperating with said aperture for focussing the image of the film thereat upon said screen, said objective lens being positioned upon the side of said aperture opposite to that upon which said source is disposed and being bodily movable relatively to said aperture, and speed-responsive control means for bodily moving said objective lens into and out of cooperative relation with said aperture in accordance with the speed of operation of said feeding means.

23. In a film handling apparatus, a screen, a source for directing light toward said screen and upon a film therebetween for creating an image on said screen, means for diminishing the light so directed, a second image receiving surface disposed at an angle to said screen, means for changing the direction in which the image from such film is projected so that said image appears on said surface, and actuating mechanism interlocking said light diminishing means and said direction changing means.

24. In a film handling apparatus, a source of light, an aperture past which a film is fed, a screen movable to a position between said light source and said aperture for protecting the film from the heat of said light, means movable to a position upon the side of said aperture opposite that upon which said source of light is disposed for deflecting the light passed by said source through the film at said aperture, and operating mechanism interconnecting said screen and said deflecting means for moving both of the same to such operative positions.

25. In combination, a motion picture projector, a screen therefor, and a framing device; said motion picture projector including a light source, an apertured gate, means for feeding a film past the aperture of said gate and through light from said source, and an objective lens for focusing the image thereby created at said gate upon said screen, said screen being placed relatively distantly to said projector; and said framing device including an auxiliary screen positioned relatively adjacent said projector, and means including an objective lens for focusing and directing such image so created at said gate upon said auxiliary screen and for preventing said image from being projected upon said main screen while it is being directed and focused upon said auxiliary screen.

26. In motion picture projecting apparatus, an apertured gate, means for feeding a film past said gate, a source for passing light through the film at the aperture of said gate, a main projection screen disposed relatively distantly to the aperture, an objective lens cooperating with said main projection screen for focussing upon said screen the image created by such passage of light through the film at the aperture, an auxiliary screen positioned relatively adjacent said aperture, and means including an objective lens and movable into the path of the light between said aperture and said main projection screen for focussing such image upon said auxiliary screen and preventing such image from reaching said main screen while it is focussed upon said auxiliary screen without interfering with the adjustment of said objective lens whereby for framing purposes the operator of said projector may secure a sharply defined image without the use of the main projection screen or the use, with consequent necessity of re-focussing, of the objective lens cooperating with the main projecting screen.

27. In motion picture projection apparatus, in combination, a first or main projecting screen; a motion picture projector having an aperture, an objective lens, a source for passing light through said aperture and said objective lens, means for feeding a film past said aperture between said light and said objective lens for projecting pictures on said first screen, and means for framing the film relatively to said aperture; a second or auxiliary screen; and auxiliary projecting means movable between an operative position and an inoperative position, means for moving said projecting means between said positions, objective means cooperating with said light source and said aperture of said projector while said auxiliary projecting means are disposed in said operative position to pass the focussed image of the film at said aperture upon said auxiliary screen as an aid to the operator in correctly "framing" the film, and means operated by the movement of said auxiliary projecting means to said operative position for preventing images from said aperture appearing upon said first or main screen, thereby rendering the framing operation invisible upon said main screen.

28. In a film handling apparatus, an aperture, means for feeding a film past said aperture, a source for directing light through the film at said aperture, a photo-electric cell positioned in the path of such light so directed through the film at said aperture, and means movable into or out of position between said cell and said aperture for deflecting such light away from said cell.

29. In a film handling apparatus, an aperture, a member for feeding a film past said aperture, means for driving said member, a source for directing light through the film at said aperture, a photo-electric cell positioned in the path of such light so directed through the film at said aperture, means for deflecting such light away from said cell, means for moving said deflecting means into position between said cell and said aperture, and an operating connection between said driving means and said moving means so constructed and arranged as to operate said moving means in timed relation to the starting or stopping of operation of said feeding means.

WARREN DUNHAM FOSTER.